United States Patent [19]

Yalof et al.

[11] Patent Number: 4,491,027
[45] Date of Patent: Jan. 1, 1985

[54] WIDE-RANGE LOAD CELL

[75] Inventors: Stanley Yalof; Lawrence Van Doren, both of San Diego, Calif.

[73] Assignee: Tetrahedron Associates, Inc., San Diego, Calif.

[21] Appl. No.: 462,721

[22] Filed: Jan. 31, 1983

[51] Int. Cl.³ .............................. G01L 1/04; G01L 1/18
[52] U.S. Cl. ................................. 73/862.52; 73/862.65
[58] Field of Search ............ 73/862.52, 862.65, 862.62, 73/711

[56] References Cited

U.S. PATENT DOCUMENTS

| | | | |
|---|---|---|---|
| 2,927,458 | 3/1960 | Moon, Jr. et al. | 73/862.52 |
| 3,439,541 | 4/1969 | Gilder | 73/862.52 X |
| 4,282,762 | 8/1981 | Zenker | 73/862.52 |

Primary Examiner—Charles A. Ruehl
Attorney, Agent, or Firm—Charmasson & Holz

[57] ABSTRACT

A wide-range load cell is installed within a press in line with the work load. The load cell measures the actual force applied to the load irrespective of any friction, binding or drag in the press mechanism. The sensitivity of the load cell is adjusted in order to provide an accurate measurement over a wide range of pressures. In some embodiments of the load cell the least sensitive of the pressure or traction bearing elements become active as the applied force approaches the maximum limit of the more sensitive element. In other embodiments of the invention the most sensitive of the pressure or traction sensing elements are switched out of operation as the applied force approaches their maximum limits. A hydraulic version of the load cell uses a combination of pressure-sensing transducers of different ranges and sensitivities. An alternate mechanical version of the load cell is based on a plurality of concentric force rings of different heights which are sequentially subject to the force of the press as the tallest and usually most sensitive amongst them are being deflected to the level of the next shortest cylinder.

10 Claims, 11 Drawing Figures

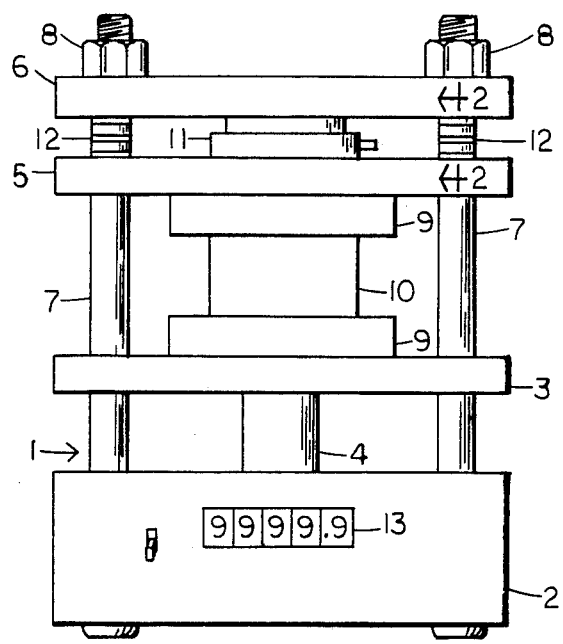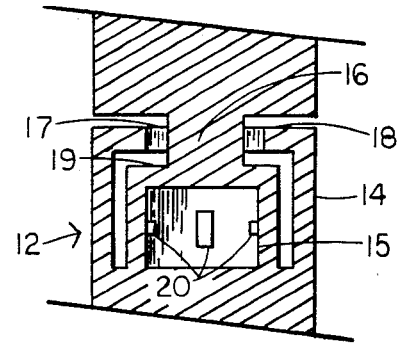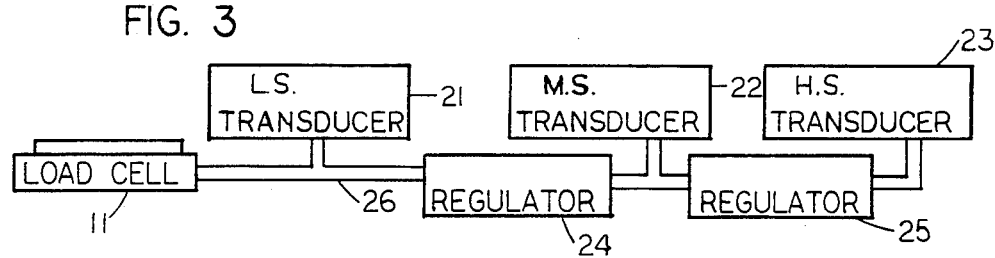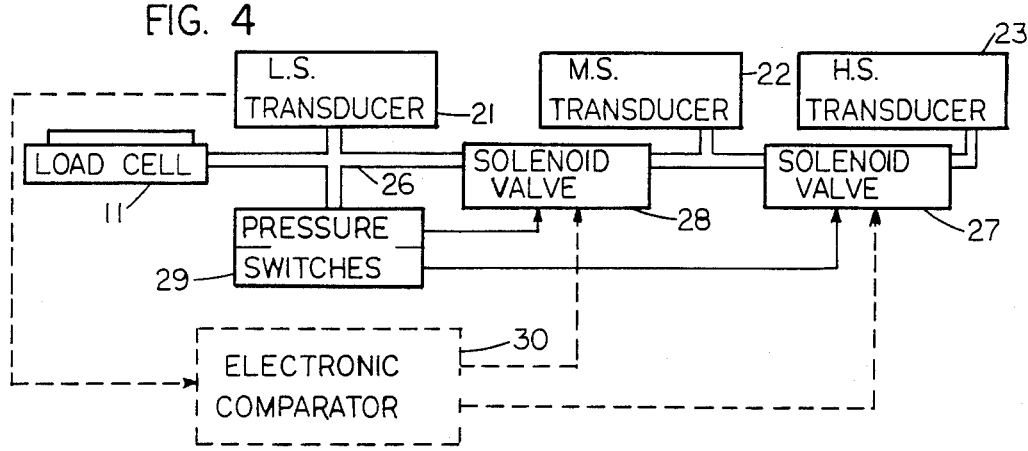

WIDE-RANGE LOAD CELL

BACKGROUND OF THE INVENTION

The control and regulation of the pressure applied by a press to a work piece is commonly achieved by monitoring the output pressure exerted by the hydraulic or pneumatic pump which supplies the press mechanism. This monitoring is accomplished via manometers and other types of pressure gauges and transducers. The pressure thus measured fails to take into account the friction and drag forces inherent to the press mechanism. The measurements cannot be accurately corrected if these parasitic forces are either unknown or tend to vary over the total range of the press.

If the press is to be used over a wide range of pressures, the monitoring gauge or transducer must be able to withstand the maximum pressure. The resolution or sensitivity of the gauge, which normally is a fraction of its fullest-scale measurement capability, can seriously affect the accuracy of any measurement in the lowest portion of the range. The problem can only be palliated by successively substituting various gauges or transducers for different ranges and sensitivities in commensuration with the maximum pressure to be applied to the work piece. This substitution can be rather cumbersome or totally impractical in many applications.

In laboratory presses ued for testing the strength of certain material and in certain manufacturing presses used in the molding of delicate parts, it is often desirable to obtain a precise and instantaneous measurement of the actual force applied to the work piece in order to achieve a more perfect control and regulation of that force. It is also desirable that this type of press be controllable with a high degree of accuracy over a wide range of pressures by means of automated process controllers free of any mechanical switching step and other slow and erratic procedures.

SUMMARY OF THE INVENTION

The principal object of this invention is to provide a means for obtaining a precise measurement of the force applied by a press to a work load, by placing a load cell in series with the load within the press mechanism.

Another object of the invention is to provide a type of load cell capable of withstanding a wide range of pressures while maintaining a very high sensitivity and accuracy in low pressure measurements.

It is also an object of the invention to provide a means for using a plurality of transducers of different sensitivity in association with the load cell.

A further object of the invention is to provide a means for protecting the most sensitive of said transducers against overload conditions.

In addition, the invention provides a means for altering the sensitivity of a pressure or traction transducer in response to the forces applied thereto.

These and other objects are achieved through the devices and methods disclosed in this specification, the preferred embodiments of which are described below.

BRIEF DESCRIPTION OF THE DRAWINGS

FIG. 1 is a front elevational view of a precision press equipped with pressure and traction sensing load cells;

FIG. 2 is a cross sectional view of a traction load cell taken along line 2—2 of FIG. 1;

FIG. 3 is a diagrammatical illustration of a multi-transducer pressure sensing system;

FIG. 4 is a diagrammatical illustration of an alternate version of a multi-transducer pressure sensing system;

DESCRIPTION OF THE PREFERRED EMBODIMENTS OF THE INVENTION

Figure 5:
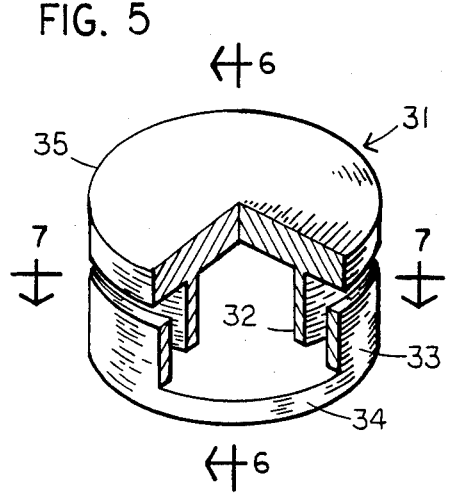
FIG. 5 is a perspective view of a multi-stage pressure load cell with a section cut away to show the internal construction.

Referring now to the drawing, there is shown in FIG. 1 a laboratory press 1 which comprises: a base 2 housing a hydraulic or pneumatic mechanism driving a compression table 3 upward by means of a shaft 4. The table 3 is guided by four columns 7. The four columns 7 are capped by a roof plate 6 secured by nuts 8 engaged over the threaded ends of the columns 7. An intermediary plate 5 is loosely guided by the columns 7. The load or work piece 10 is held between two platens 9; one of the platens being secured to the upper face of the compression table 3, the other being secured to the under surface of the intermediary plate 5. A load cell 11 responding to the pressure exerted by the table 3 against the load 10 is interposed between the upper surface of the intermediary plate 5 and the roof plate 6. Built into each column 7 is a load cell 12 responsive to the traction withstood by the column, used in addition or in place of the load cell 11 to measure the amount of pressure applied to the work load 10. The force applied by the press 1 to the work piece 10 is displayed on a numerical readout 13 on the face of the base 2.

The load cell 11 may be of the hydraulic type, feeding pressurized fluid to a plurality of transducers 21, 22 and 23 mounted in parallel at the output of the load cell 11. The transducers have different and complimentary ranges and include a high pressure, low sensitivity transducer 21; a medium pressure, medium sensitivity transducer 22; and a low pressure, high sensitivity transducer 23. A medium range regulator 24 is interposed on the pressure line 26 between the low sensitivity transducer 21 and the medium sensitivity transducer 22. The medium range regulator 24 is calibrated to prevent its output pressure from exceeding the maximum pressure range of the medium sensitivity transducer 22. Similarly, a low range regulator 25 is installed at the input of the high sensitivity transducer 23, and is calibrated to prevent the application of excessive fluid pressure to the high sensitivity transducer 23.

The pressure measurement can thus be obtained over a broad range from either the high sensitivity transducer 23 in the lower part of the range, from the medium sensitivity transducer 22 in the medium part of the range, or from the low sensitivity transducer 21 in the upper part of the range with relatively high resolution and accuracy. The regulators 24 and 25 act as a safety device preventing the medium sensitivity and high sensitivity transducer from being overloaded. The regulators 24, 25 are devices well known to those skilled in the art and may be of a spring-biased diaphragm type or other appropriate design.

Illustrated in FIG. 4 is an alternate multi-transducer system for measuring the output of the load cell 11. In this case the high sensitivity transducer 23 and medium sensitivity transducer 22 are protected by means of solenoid control valves 27 and 28. The first solenoid valve 27 which protects the high sensitivity transducer 23 is shut off as soon as the pressure sensed by the load cell approaches the upper range limit of the transducer. Subsequently, the second solenoid control valve 28 is closed when the pressure approaches the maximum range limit of the medium sensitivity transducer 22.

The valves 27, 28 may be controlled by the output of pressure switches which are set to trip at pressure levels corresponding to the maximum range limit of the transducers. Alternately, the valves 27, 28 can be controlled by the output signals of an electronic comparator 30 which monitors the pressure measured by the least sensitive transducer 21 or the medium sensitivity transducer 22.

Figure 6:
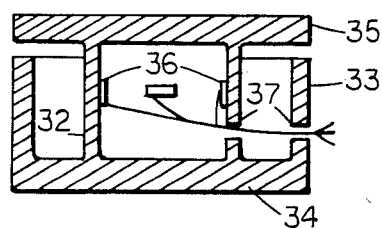
FIG. 6 is a cross sectional view thereof taken along line 6—6 of FIG. 5.
Figure 7:
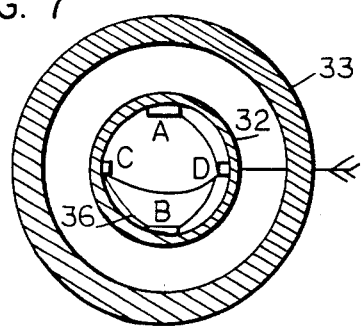
FIG. 7 is a cross sectional view thereof taken along line 7—7 of FIG. 5.
Figure 11:
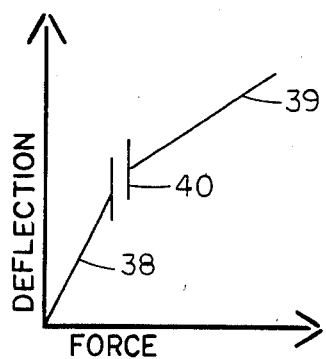
FIG. 11 is a graph illustrating the mechanical response of the multi-range load cells.
Figure 10:
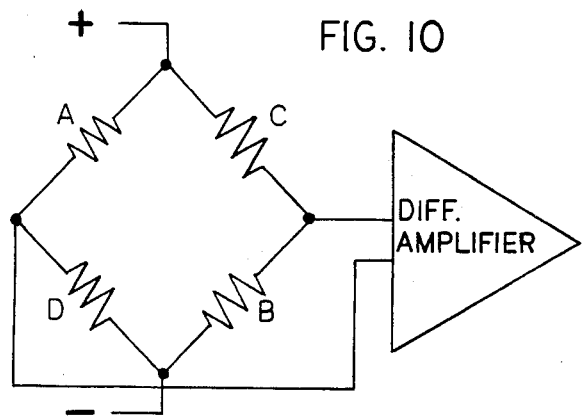
FIG. 10 is an electrical diagram of the strain gauge system used in connection with the multi-range load cells.

In place of the hydraulic load cell 11 shown in FIG. 1 could be substituted a multi-range mechanical load cell of the type illustrated in FIGS. 5-7. This device comprises a metallic cylinder 32 placed vertically between a base 34 and a roof plate 35. When the load cell 31 is compressed between the plates 5 and 6 of the press 1, the walls of the cylinder 32 are deflected or bent in proportion in the force applied by the press 1. The deflection is sensed by a set of strain gauges 36. Two pairs of strain gauges (A)-(B) and (C)-(D) are used and are connected in a bridge arrangement as shown in FIG. 10. Two of the strain gauges (A)-(B) are bonded horizontally to the inner wall of the cylinder 32 and serve as references. The two other strain gauges (C)-(D) are bonded vertically to the same walls and respond to the deflection imposed by the press 1. A second cylinder 33 concentric to the first one but shorter and with thicker and stiffer walls begins to support the load when the deflection of the first cylinder 32 brings the roof plate 35 in contact with its upper edge. At this point the deflection sense by the strain gauges 36 in the wall in the inner cylinder 32 is limited to the deflection suffered by the stiffer cylinder 33. The ratio of deflection to force i.e. the sensitivity of the load cell 31 is abruptly changed as illustrated in the diagram of FIG. 11. The most sensitive part 38 of the strain gauge bridge response curve corresponds to the deflection of the first inner cylinder 32 before the roof plate 35 enters into contact with the thicker cylinder 33. The second and least sensitive part 39 of the strain gauge response curve corresponds to the condition where both cylinders 32, 33 are supporting the load. The intermediary transition region 40 corresponds to the partial contact between the roof plate 35 and the upper edge of the outer cylinder 33 which is electronically interpolated by standard means to give a smooth transition. The strain gauge wiring is routed through two small holes 37 drilled in the walls of the cylinders 32 and 33. This wiring carries the electrical power to the strain gauge and returns the output signals which is fed to the input of a differential amplifier or other measurement instrument.

Figure 8:
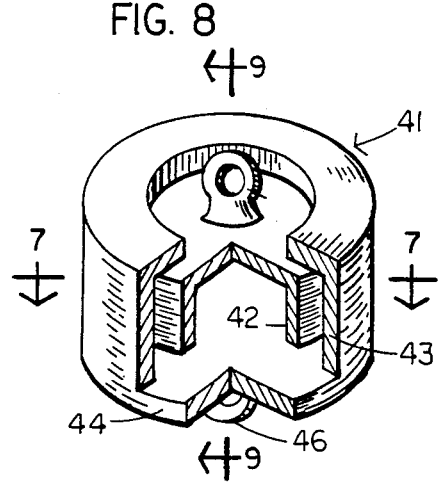
FIG. 8 is a perspective view of a multi-range traction load cell with a cut away section showing the internal construction.
Figure 9:
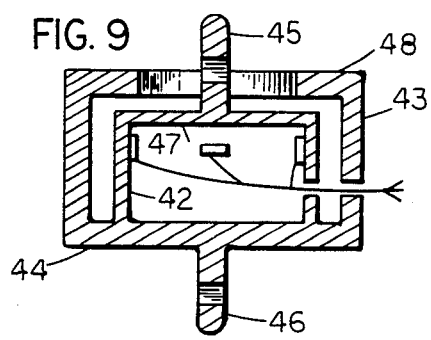
FIG. 9 is a cross sectional view thereof taken along line 9—9 of FIG. 8.

A traction sensitive version 41 of the load cell is illustrated in FIGS. 8 and 9. In this embodiment traction is applied to the two rings 45 and 46. The upper ring 45 is connected to the roof 47 of the inner and most sensitive cylinder 42; the lower ring is connected to the base 44 common to both cylinders. The stiffer, outer cylinder 43 has an inner flange 48 which comes into contact with the roof 47 of the inner cylinder when this cylinder is stretched under the action of the pulling force. The mechanical deflection suffered by the inner cylinder is measured as in the previously described version by a set of strain gauges installed and operating in the manner previously discussed and illustrated in FIGS. 7, 10 and 11.

A version of the traction-sensitive load cell 43 may be optionally installed in each one of the press columns 7 as shown in FIGS. 1 and 2. In this embodiment the upper ring is replaced by a member 16 connecting the roof of the upper cylinder to the upper section of the column 7. The base common to both cylinders is formed by an integral part of the lower section of the column 7. The outer cylinder 14 and the inner cylinder 15 operate as explained in connection with FIGS. 8 and 9. The connecting member 16 moves freely through the orifice 17 delimated by the flange 18 associated with the outer cylinder 14. The deflection of the inner cylinder is changed when the roof 19 of the inner cylinder enters in contact with the flange 18. A set of strain gauges 20 is installed and operates as previously discussed in reference with FIGS. 8, 10 and 11. When such traction-sensitive load cells are installed on the four columns 7 of the press, an accurate measurement of the total force applied to the work piece 10 would be given by summing the output of the four load cells.

This type of multi-range load cell could be implemented using other geometrical arrangements of the mechanical components. For instance, the force could be applied orthogonally instead of axially against the walls of the cylinder with the stiffer, least sensitive cylinder nested within the larger, most sensitive one. Other structural elements which are brought to a load-bearing position successively as the pressure or traction is increased could also be employed in a variety of configurations. A larger number of sensing elements of various sensitivity can be arranged in a great variety of combinations in order to obtain a composite response curve from the load cell as required for a particular application.

While the preferred embodiments of the invention have been described and modifications thereto have been suggested, it should be understood that other embodiments may be devised and an infinite variety of related devices can be implemented without departing from the spirit of the invention and the scope of the appended claims.

What is claimed is:

1. An apparatus for measuring a wide range of forces which comprises
   a plurality of force responsive elements of different sensitivities and different resistances to said forces;
   means for subjecting the most sensitive of said elements to said forces over the entire range of measurements;
   means for monitoring the response of the most sensitive element to said forces;
   means for additionally subjecting at least one other element of lesser sensitivity and greater resistance to said forces as the result of the prior response of at least one other more sensitive element, whereby increasing forces are progressively opposed by sequential addition of elements of greater resistance; and a pair of plates oppositely subjected to said force;

said elements comprising mechanically compressible cylinders of different heights interposed between said plates and axially orientated along the direction of travel of said plates such that said less sensitive cylinder is subjected to said forces only after said most sensitive cylinder has been mechanically compressed by said force.

2. The apparatus claimed in claim 1 wherein said cylinders are concentrically engaged one within the other.

3. The apparatus claimed in claim 1 wherein said means for monitoring the response of the most sensitive element comprises shape-modification sensors applied to the most sensitive of said cylinders.

4. The apparatus claimed in claim 3 wherein said sensors comprise strain gauges.

5. The apparatus claimed in claim 1 wherein said cylinders comprise:

a first compressible cylinder axially interposed between said plates;

a second compressible cylinder shorter than the first cylinder, said second cylinder being axially mounted against one of the plates and contacting the other plate only after the first cylinder has been compressed to the length of the second cylinder.

6. The apparatus claimed in claim 5 wherein said means for monitoring the response of the most sensitive element comprises means for measuring the degree of compression of the first cylinder.

7. The apparatus claimed in claim 1 mounted in series with a work piece in a compression press.

8. An apparatus for measuring a wide range of forces which comprises:

a first extensible cylinder axially subjected to said forces over the entire range of measurement of said forces;

at least one further extensible cylinder coaxially located with the first cylinder and of lesser sensitivity and greater resistance to said forces than said first cylinder;

means for monitoring the response of said first cylinder to said forces; and means for additionally subjecting said further cylinder to said forces as the result of the prior responses of said first cylinder;

said means for additionally subjecting said further cylinder to said forces comprising means for coupling the ends of the two cylinders in parallel configuration when the first cylinder reaches a certain degree of extension.

9. The apparatus claimed in claim 8, wherein said first cylinder is shorter than said further cylinder and axially located within said further cylinder, said cylinders being coupled together at one end, said further cylinder having an opening at its other end through which said forces are applied to said first cylinder, said further cylinder being subjected to said forces when said first cylinder has been extended to the length of said further cylinder.

10. An apparatus for measuring a wide range of forces, which comprises:

a plurality of force responsive elements of different sensitivities and different resistances to said forces;

means for oppositely applying force to said elements, said elements comprising cylinders of different dimensions concentrically engaged one within the other between said force applying means, said cylinders having opposed surfaces defining a gap in the direction of application of said forces, and the most sensitive one of said cylinders being positioned to engage said force applying means over the entire range of measurement;

said force applying means comprising means for applying force to said most sensitive cylinder in a direction tending to close said gap over the entire range of measurement and means for additionally applying force to at least one cylinder of lesser sensitivity when said most sensitive cylinder has been deformed by said force so as to close said gap, whereby the effect of said force on said most sensitive cylinder is modified and increasing forces are progressively opposed by the sequential addition of cylinders of greater resistance; and means for measuring said force over the entire range comprising means for monitoring the response of the most sensitive cylinder to said forces.

* * * * *